United States Patent [19]
Howell et al.

[11] Patent Number: 5,351,318
[45] Date of Patent: Sep. 27, 1994

[54] FIBER OPTIC COMMUNICATION SYSTEM AND FIBER OPTIC MODULATOR

[75] Inventors: Michial D. Howell, Stanford; Gordon S. Kino, Santa Clara County, both of Calif.

[73] Assignee: The Board of Trustees of the Leland Stanford Jr./University, Palo Alto, Calif.

[21] Appl. No.: 42,721

[22] Filed: Apr. 5, 1993

[51] Int. Cl.$^5$ .............................................. G02F 1/125
[52] U.S. Cl. .......................................... 385/3; 385/7; 385/24
[58] Field of Search .......................................... 385/1–4, 385/7, 11, 12, 13, 14, 24, 27, 28, 39, 40

[56] References Cited

U.S. PATENT DOCUMENTS

| | | | |
|---|---|---|---|
| 4,649,529 | 3/1987 | Avicola | 385/12 |
| 4,735,476 | 4/1988 | Heffner et al. | 385/7 |
| 4,792,207 | 12/1988 | Shaw et al. | 385/7 |
| 4,867,517 | 9/1989 | Rawson | 385/24 |
| 4,991,923 | 2/1991 | Kino et al. | 385/1 |
| 5,022,732 | 6/1991 | Engan et al. | 385/28 |

OTHER PUBLICATIONS

D. B. Patterson, A. A. Godil, G. S. Kino, B. T. Khuri-Yakub, *Detachable 400-MHz acousto-optic phase modulator for a single-mode optical fiber*, Optics Letters, vol. 14(4), 248–250, Feb. 15, 1989.

B. L. Heffner, G. S. Kino, B. T. Khuri-Yakub, W. P. Risk, *Switchable fiber-optic tap using the acousto-optic Bragg interaction*, Optics Letters vol. 11, 476–478 (Jul. 1986).

Primary Examiner—Frank Gonzalez
Attorney, Agent, or Firm—Flehr, Hohbach, Test, Albritton & Herbert

[57] ABSTRACT

A modulator adapted to be acoustically coupled to an optical fiber for applying acoustic waves across the fiber at a spatial and phase angle with respect to one another to compress and decompress the optical fiber at said spatial angle responsive to an electrical signal whereby to modulate the polarization state of an optical wave travelling past said modulator. An optical communication system in which light waves are transmitted from a transmitting end to a receiving end and whose polarization is modulated by an acoustic modulator responsive to an input signal and the output signal is demodulated to recover the signal.

14 Claims, 4 Drawing Sheets

FIG_1

FIG_2

FIG_3

FIG_4

FIG_5

FIG_6

FIG_7

FIG_8

FIG_9

FIG_10A

FIG_10B

FIG_11A

FIG_11B

FIBER OPTIC COMMUNICATION SYSTEM AND FIBER OPTIC MODULATOR

BRIEF DESCRIPTION OF THE INVENTION

This invention relates generally to a fiber optic communication system and a fiber optic modulator and more particularly to a fiber optic communication system which is insensitive to temperature variations and changes in position of the optical fiber.

BACKGROUND OF THE INVENTION

Modulators have been used to modulate the phase of an optical wave in an optical fiber. These modulators have used acoustic waves to periodically compress and decompress the fiber from an unperturbed value to periodically increase and decrease the fiber's density. This causes the refractive index of the fiber to periodically vary. When the acoustic wave is large in wavelength compared to the area of the beam, then the light beam interacts with a region that will appear to have a uniformly varying index of refraction. The optical thickness of the region is the physical thickness times the index of refraction. If the index of refraction varies sinusoidally, then the optical thickness does too, and the phase of the light signal, when measured, will have a sinusoidal perturbation proportional to the change in index of refraction, and thus to the acoustic wave that caused the perturbation.

If an acoustic strain wave of amplitude S travels through a region with unperturbed index of refraction 'n', then the change in 'n' will roughly be given by $\Delta(1/n^2) \approx B$, where B is known as the relative impermeability, and $\Delta B \approx p^*S$ where S is the acoustic strain and p is a strain-optic coefficient. The strain optic coefficient is (a number determined by the material properties of the substance in which the optical and acoustic waves are interacting. In full form, this is expressed as a tensor, or matrix, equation that takes into account that the index of refraction, n, in a material, is not necessarily the same in all directions. A good example of a material with this non-isotropic nature is natural calcite. The analysis below can be extended to a full three dimensional tensor analysis with arbitrary materials and propagation angles of the optical and acoustic waves. No essential generality is lost in the following pseudo- one-dimensional analysis, since it is merely a component analysis of the full problem that can be added to essentially identical solutions for the other tensor components.

When the acoustic wave is at an angle to the optical wave, then the acoustic wave can interact with the light wave, changing the phase and polarization of the light wave, and this interaction will depend upon the relative and, sometimes, the absolute directions of the acoustic and optical beams.

The next important concept is that an acoustic wave can cause three distinct effects. Imagine a system with an optical signal traveling in the Z direction (out of the paper) and zero in the Y direction. Imagine then that it has polarization with some component in the X direction and some component in the Y direction. Now let an acoustic wave in the X-Y plane interact with the light wave. First, imagine the acoustic wave is also traveling in the X direction. It can change the effective density in the X direction and thus couple from X to X where the net effect is to alter the phase of the X component of the optical beam. Second, if you are compressing the material X, it will, by analogy, bulge outward in Y. Thus the signal in Y is also affected, albeit to a different degree.

Third, and most pertinent to the modulator, in addition to changing the phase within the X and Y polarizations, it can also couple some of the signal from the X polarization into the Y polarization, and vice versa. Thus, the acoustic wave can be used to couple between polarizations in an optical signal. This will be referred to later as either cross coupling or the $\Delta B_6$ term where $\Delta B_6$ is a term in the impermeability tensor.

A very strong and familiar analogy is the use of standard optical polarizers with an optical signal. Without loss of generality, imagine a polarization plate with polarization axis (polarization direction at which light passing through the polarizer will be unaffected) in the X direction. If an optical signal with Amplitude A strikes the polarizer with the signal polarization at some angle $\theta$ to the X direction, then the light that emerges through the plate will have amplitude $A\cos(\theta)$ and be polarized in the X direction. Most importantly, note that 100% of the signal is passed if $\theta = 0$, passed if $\theta = 90°$.

Therefore, if a second polarizer is placed after the first, with polarization axis at an angle $\phi$ to X, then the process is iterated since the beam emerging from polarizer #1 is polarized in the X direction. The beam will emerge from the second polarizer reduced in amplitude by $\cos(\phi)$ and polarized at angle $\phi$ from the X direction. Again, if this second polarizer is aligned in the Y direction, then zero signal will pass through since, with X and Y perpendicular, $\phi = 90°$ and $\cos(\phi) = \phi$.

The cross coupling effect, mentioned above, will have the same general effect as putting a third polarization plate in between the two crossed ones. If the third plate is parallel to either of the others, then nothing is changed. Say, however, that it is placed at an intermediate angle, say some angle $\theta\pi$ away from X, and that the signal emerging from polarizer #1 has amplitude A in the X direction. Then the signal will pass through the intermediate polarizer with amplitude $A\cos(\theta)$, polarized at an angle $\theta$ from X. It will then hit the Y oriented polarizer at an angle $(90° - \theta)$ away from the Y oriented axis (since X and Y are 90° apart). Thus the input signal will be further reduced from amplitude $A\cos(\theta)$ to $[A\cos(\theta)]\cos(90° - \theta)$ which is the same as $A\cos(e)\sin(e)$. Thus, excepting $\theta = 0$ or 90 degrees, a non-zero component will be coupled across. The effect is most efficient when $\theta = 45°$.

The shortfall of such a system is that it will be, at best, very. inefficient, and, at worst, utterly ineffectual if the angle between the acoustic wave and optical polarization is 0 or 90°. The effect is basically saying that the two polarization modes, or states of the optical signal are usually orthogonal, or, in other words, that there would normally be no coupling between them. The introduction of the acoustic wave is like placing an intermediate polarizer in between these orthogonal ,modes so that coupling can take place. It depends, however, on this intermediate angle being picked and maintained optimally.

Where the plane of .polarization of the optical wave in the fiber is at an angle with respect to the direction of compression and expansion, this has resulted in modulation of the plane of polarization of the optical wave traveling in the fiber. The modulation is then detected by an optical analyzer followed by an optical detector which receives the optical wave and provides an output electrical signal representative of the modulation. Problems arise because of changes in the plane of polarization along the optical fiber due to changes in temperatures and position of the optical fiber and other environmental conditions to which the optical fiber is subjected.

One type of modulator excites and propagates longitudinal acoustic waves across the fiber in the x direction. The periodic compression and expansion of the fiber due to the acoustic waves causes the polarization state of a transmitted optical wave to shift. A specific example is an optical wave polarized at 45° to the x-direction to have its polarization shifted to 135° with respect to the x-direction. If an analyzer is placed at the output of the optical transmitting fiber and its output applied to a detector, an amplitude modulated signal will be generated by the transducer, whose frequency is dependent on the frequency of the electrical drive signal. A signal can be transmitted by varying the drive power to the modulator, in the extreme, by turning the modulator on and off, responsive to the signal. As described above, the polarization state (circular or linear) can easily change in a long fiber communication system. There could be a zero output response if correct angles of excitation and detection are not maintained.

OBJECTS AND SUMMARY OF THE INVENTION

It is a general object of this invention to provide an improved fiber optic communication system.

It is another object of the invention to provide an optical communication system in which the optical waves traveling in the fiber are modulated by compressing and expanding the fiber in a manner which is not critical with respect to the angle of polarization of the input optical wave.

It is a further object of the invention to provide an improved fiber optic modulator for modulating optical waves passing along a single optical fiber without interrupting the fiber.

Another object of the invention is to provide an optical communication system where modulators can be placed along the fiber, without interrupting the fiber, to communicate from selected locations along the fiber to the end of the fiber.

It is another object of the invention to provide an optical communication system which includes a fiber optic modulator in which the angle of excitation of the optical wave are not critical.

It is an additional object of the invention to provide an optical fiber communication system which includes a fiber/optic modulator in which the polarization direction of the unmodulated output signal is not critical.

It is a further object of the invention to provide a fiber optic modulator which is simple in construction.

These and other objects are achieved by an optical communication system for transmitting information from one location to another by modulating light waves which travel along an optical fiber and a receiver for receiving the optical wave in which the optical fiber extends between said locations and optical waves are introduced into one end of the fiber which travel along the fiber to the other end. A modulator responsive to modulated electrical signals changes the polarization state of said optical waves and the polarization changes are detected at the output end of said fiber to provide a modulated output signal. The invention is further directed to a modulator for changing the polarization state of light waves transmitted along an optical fiber responsive to an electrical input signal that includes acoustic transducers placed at a spatial angle with respect to one another to transmit acoustic waves through an optical fiber to compress and decompress the fiber and periodically increase and decrease its refractive index at two angles with respect to the axis of the fiber, preferably perpendicular, to modulate the polarization state of the light wave traveling along the axis of the fiber past said region of compression and decompression.

BRIEF DESCRIPTION OF THE DRAWINGS

The foregoing and other object of the invention will be more clearly understood from the following description when read in connection with the accompanying drawings of which.

DESCRIPTION OF PREFERRED EMBODIMENT

Figure 1:
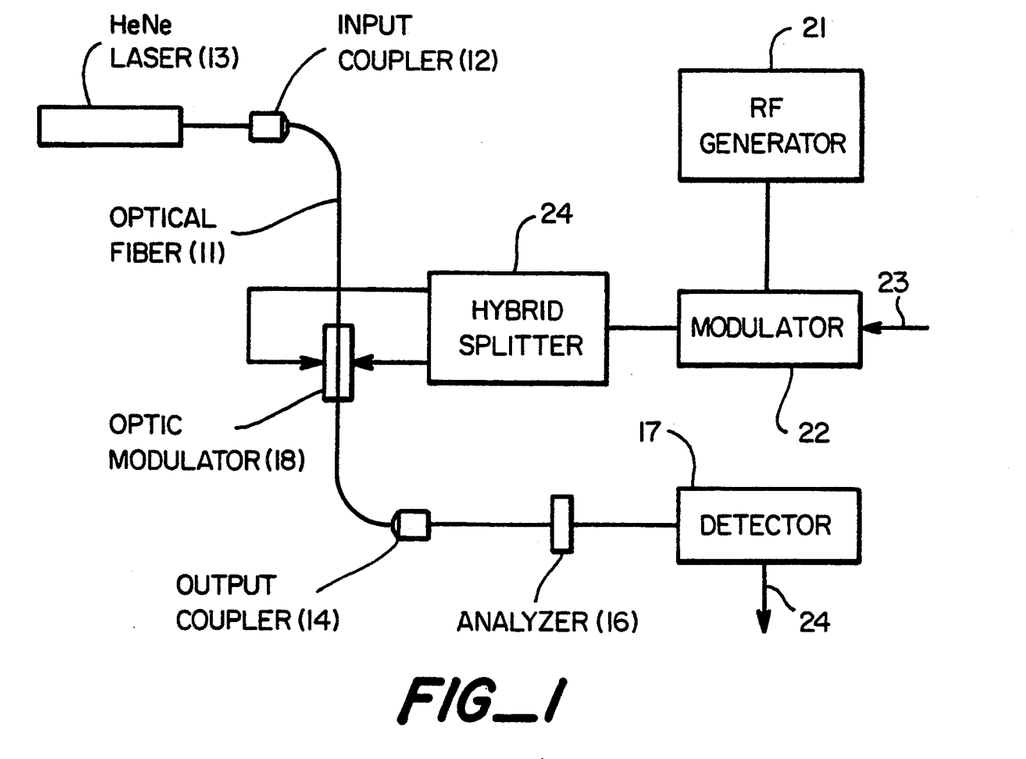
FIG. 1 is a block diagram of a fiber optic communication system in accordance with the invention.

Referring to FIG. 1, a typical optical communication system is illustrated. This system includes an optical fiber 11. An input coupler 12 couples an input optical wave from a laser 13 into one end of the fiber 11 so that the optical wave travels along the fiber and to the output coupler 14 whose output is directed to an analyzer 16 and detector 17. In many applications the laser output can be coupled directly into the fiber. The optical wave in the fiber travels past the fiber optic modulator 18, where its polarization state is modulated. As will be presently described, the fiber optic modulator modulates the refractive index of the optical fiber at two spatial angles to alter the state of polarization of the optical wave.

In the communication system shown, an r.f. generator 21 generates an r.f. electrical signal which is applied to a modulator 22 which modulates the r.f. signal in accordance with input signal information 23. The output of the modulator 22 is applied to a hybrid splitter 24 which applies the signal to the two transducers (to be described) of the optic modulator at a predetermined phase relationship. The transducers generate two acoustic waves traveling, in an optimized solution, at a spatial angle of 45°, and again for an optimal signal interaction, out of phase 90° in time. Spatially, if the light wave is at 0° or 90° in polarization angle with one of the acoustic waves, then it is at 45° with the other, and will interact optimally with it. In time, the acoustic waves are driven 90° apart so that they do not overlap in effect. If they were driven in phase, then they effectively just create a composite acoustic wave traveling in a direction halfway in between the two components. If driven 90° out of phase, then as the first wave is at maximum or minimum amplitude, the other is at zero amplitude. This creates a net overlap of zero. Similarly, if the second wave is at maximum or minimum amplitude, the first wave is at zero amplitude to create a net overlap of zero. Figuratively speaking, if you think of the first acoustic wave compressing the material in the X direction, then, at maximum compression, the second wave is at mid-cycle and not affecting the light wave. A quarter time cycle later, the first wave is at mid-cycle and the second wave is at an extreme, so the compression is at 45° to the X direction. Another quarter cycle later, the first wave is at maximum decompression and the second wave is again at mid-cycle, effectively putting the compression angle at 90°.

Effectively, a one acoustic beam system gives a fixed position polarizer that can work, but is dependent on the optical polarization angle at such time as the light wave interacts with the acoustic wave. The two beam system of the present invention compresses and decompresses the fiber to effectively rotate the strain at the acoustic frequency. The strain will always couple some part of an incoming optical signal into an orthogonal polarization state, whether the signal be linearly, circularly, or elliptically polarized.

By use of either fiber or bulk components, the signal, as it emerges from the far end of the fiber, can always be turned into a linearly polarized signal. If the baseline optical carrier is adjusted to a linearly polarized signal at the exit. Then cross coupled signals will always emerge in the orthogonal linear polarization. Similarly, if the output beam carrier is adjusted to be circularly polarized, then the cross-coupled signal will be of the opposite handedness circular polarization. The circular beam can be broken down in a number of ways to extract the cross coupled signal as an information carrier. More generally, there are a number of ways in which an output signal of any polarization can be adjusted or measured so as to extract information carried in some particular polarization state.

Figure 10A:
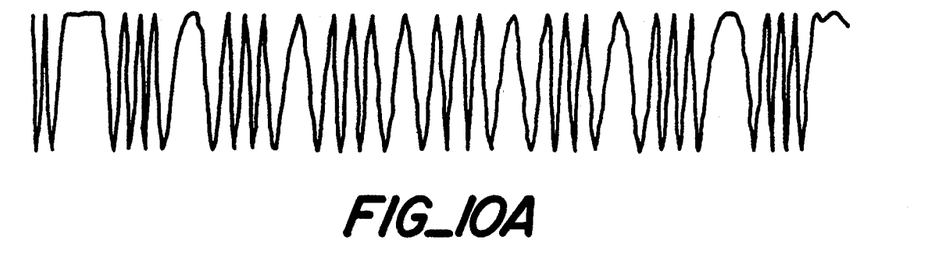
FIGS. 10A and 10B show frequency modulation input and output signals.
Figure 10B:
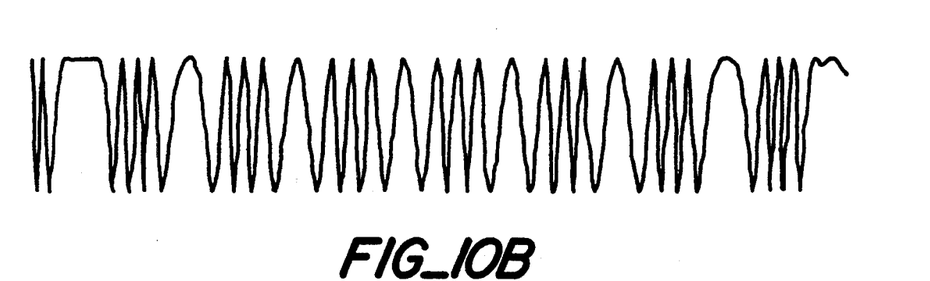
Figure 11A:
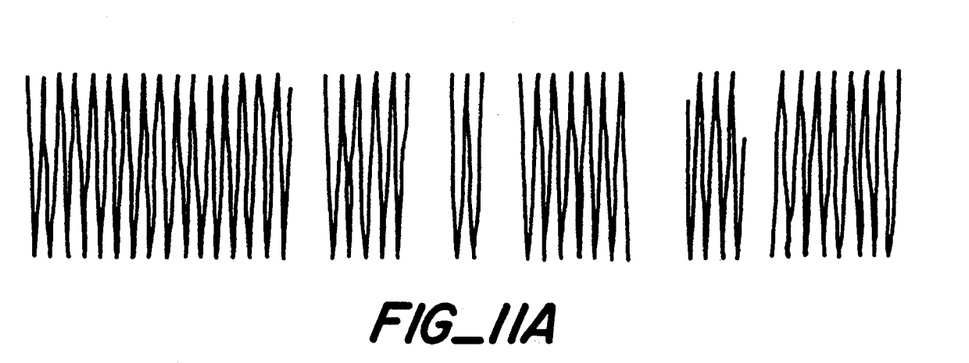
FIGS. 11A and 11B show pulse width modulation input and output signals.
Figure 11B:
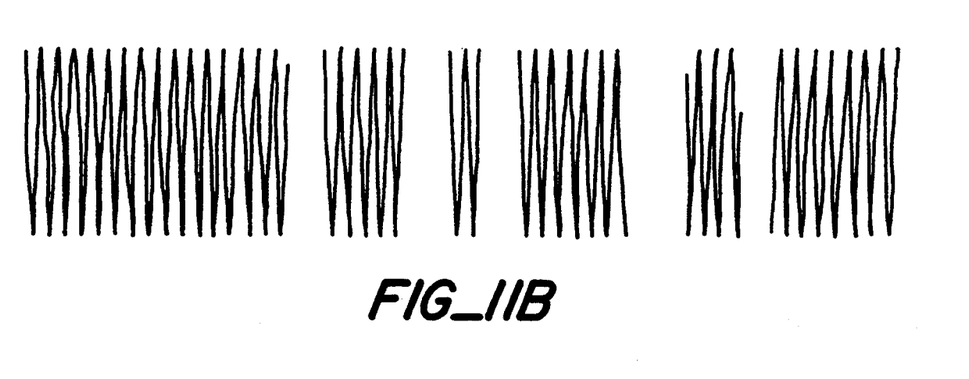

In a communication system, the modulator 22 may be a frequency modulator whereby the output signal applied to the hybrid splitter 24 is a frequency modulated signal. Input and output frequency modulated signals are shown in FIG. 10A and 10B. The modulator may also be a pulse code modulator in which the input information is pulse coded and the output detector detects bursts of optical energy which is detected to provide a pulse modulated output which can be demodulated to provide the input signal information 23. This is illustrated by the pulse width example of FIGS. 11A and 11B.

Figure 2:
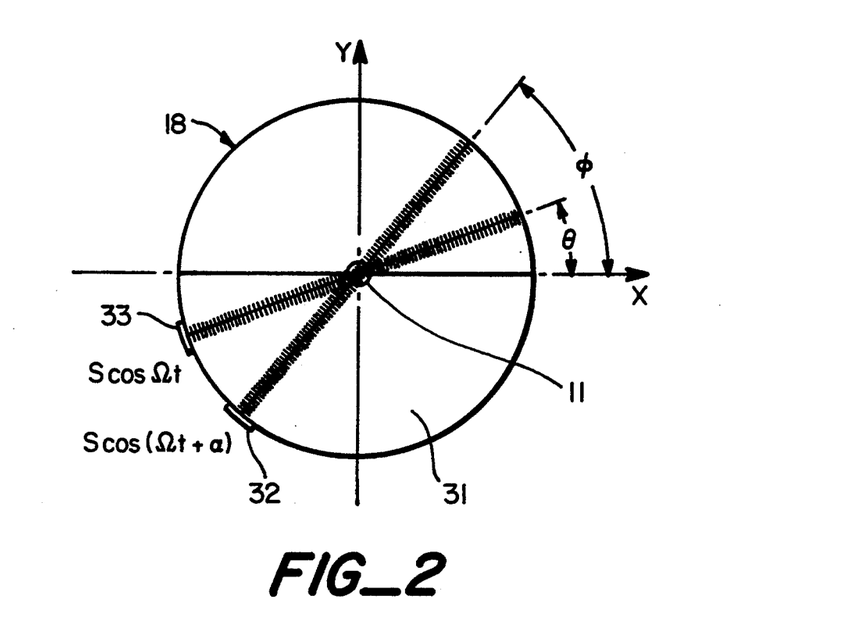
FIG. 2 illustrates the compression and expansion of an optical fiber by a pair of transducers disposed at a spatial angle $\phi - \theta$ with respect to one another and driven at a time phase $\alpha$ relative to one another.

Referring now to FIG. 2, there is shown a modulator which includes split capillary 31 with acoustic transducers 32 and 33 mounted on one surface to induce longitudinal acoustic waves transversely through the fiber 11 at spatial angles $\phi$ and $\theta$. This compresses and expands the fiber in two spatial directions to change its index of refraction to thereby modulate the polarization state of an optical wave traveling past this region of the fiber 11. We have discovered that by using two transducers at an angle $\phi$-$\theta$ with respect to one another there is modulation of the optical wave travelling past the modulator regardless of its polarization state. The modulation, however, is dependent on the angles $\phi$-$\theta$ between the transducers and the phase angle $\alpha$ of the input signal, as shown in FIG. 2. The signal recovery is optimum when the transducers are spatially 45° apart with respect to one another and the signals to the transducers are 90° out of phase. The polarization of the input wave is modulated as long as the spatial separation of the transducers is not 0° or a multiple of 90 spatial degrees and the phase of the excitation signals is greater than 0° and less than 180° when the transducers are equidistant from the center of the optical fiber. More generally, the relative phase of the acoustic waves at the optical fiber should be greater than 0° and less than 180°. The phase is dependent both upon the phase of the electrical signal and the distance of the transducers from the center of the optical fiber.

Figure 3:
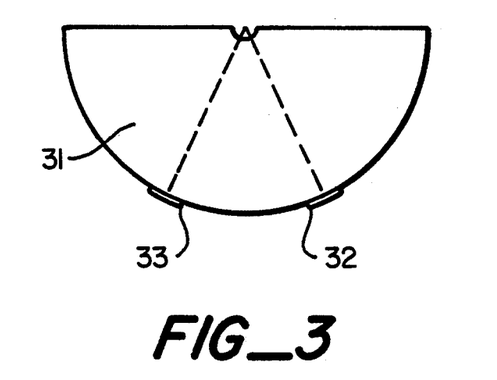
FIG. 3 shows a capillary which has been lapped in half with acoustic transducers applied thereto to form a modulator in accordance with the preferred embodiment of the invention.
Figure 4:
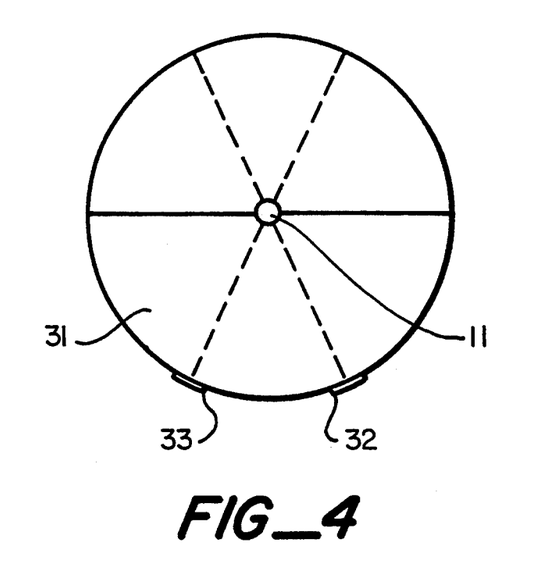
FIG. 4 shows the modulator of FIG. 3 applied to an optical fiber for exciting expansion and compression waves in the fiber to modulate its index of refraction with a back-up lapped capillary half.
Figure 5:
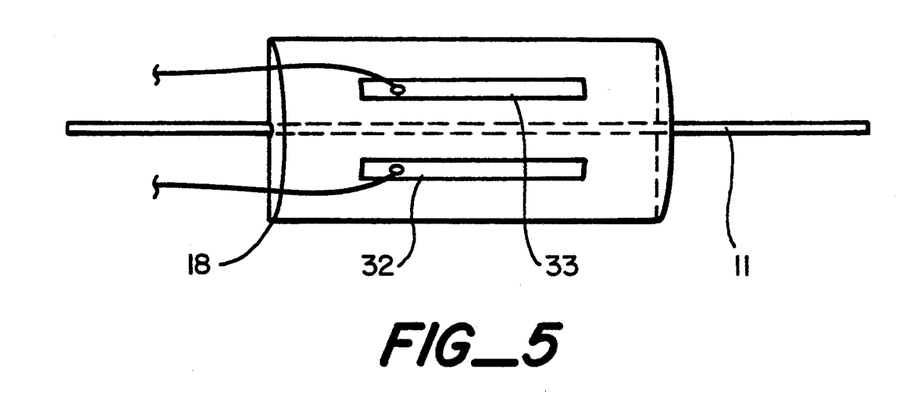
FIG. 5 is a side elevational view showing the optical modulator applied to an .optical fiber.
Figure 6:
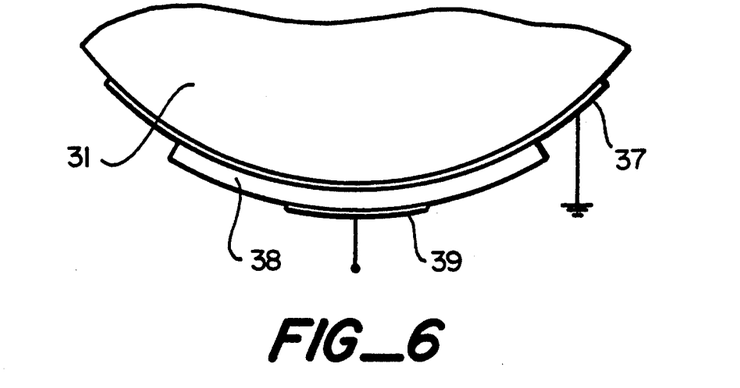
FIG. 6 is an enlarged view of a portion of a capillary showing an acoustic transducer.

Referring more particularly to FIGS. 3-6, the modulator is constructed from a capillary by lapping the capillary in half, as shown in FIG. 3. The outer surface of the capillary is then coated with approximately 50 Å of titanium formed on the surface by evaporation in a suitable apparatus, followed by the evaporation of a 2000 Å film of gold to form a lower transducer contact or ground plane 37, as shown in FIG. 6. These depositions are done with the capillary heated to about 200° C. This has been shown to give better oriented gold in the ground plane resulting in a better oriented zinc oxide applied in the next step of the process. Immediately after the gold deposition, the substrate is mounted in a sputtering system and an approximately 6-micron layer 38 of zinc oxide is deposited on the gold. This thickness corresponds to a half wavelength thickness at an operating frequency of 400 MHz. If the modulator is to be operated at other frequencies, the thickness is selected to provide resonance for that particular frequency. By masking and etching techniques, transducers are defined with a top conductive contact 39. In this example, the transducers 32, 33 are long and thin as shown in FIG. 5, with the long dimension parallel to the axis of the fiber, although this is not necessary.

An important consideration in the modulator is to make good acoustic contact to the fiber, thereby providing good transmission of the acoustic waves through the fiber and minimizing reflections at the interface between the capillary and the fiber, which might give rise to acoustic resonances. Thus, it is preferable to provide a contacting material whose acoustic impedance is comparable to the impedance of the fiber. Liquid gallium metal is a good choice for providing contact between quartz capillaries and quartz fibers. However, gallium does not stick to glass and forms an oxide skin which degrades coupling. We have found that we can overcome these difficulties by two strategies. One strategy is depositing a thin metal film on the surfaces of both the fiber and the capillary; a thin layer of indium, perhaps 3000 Å thick, is a good choice. Indium has the advantage that it is wet fairly easily by gallium. A second strategy is temporarily eliminating any oxide on the gallium using an acid flux such as dilute hydrochloric acid. Another possibility is to make a more permanent bond by using indium tin solder. In this case, the indium/tin alloy can be evaporated onto the nickel surface with fiber pushed against the nickel coated capillary and both heated until the solder runs. It is vital in all Cases to exert care to avoid damaging the zinc oxide transducers by protecting them with wax or other material during application of the capillary. A third possibility is to use a suitable grease interface between the capillary wall and the fiber.

In operation of the modulator, the transducers will preferably be formed on the surface of the capillary at 45° with respect to one another, and the transducers are excited 90° out of phase to modulate part of the optical wave traveling past the transducer into an orthogonal polarization state. The wave travels along the optical fiber 11 and, as previously described, the analyzer 16 provides an output optical signal which is modulated in accordance with the modulation applied at the modulator. The detector converts the optical signal modulation to an output modulated signal.

Figure 7:
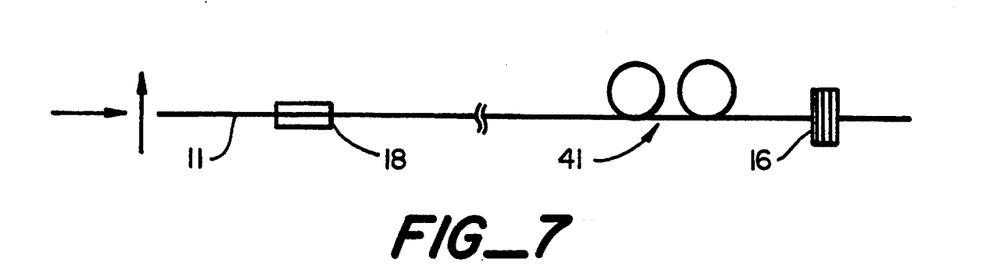
FIG. 7 illustrates one system for recovering the modulation signals.
Figure 8:
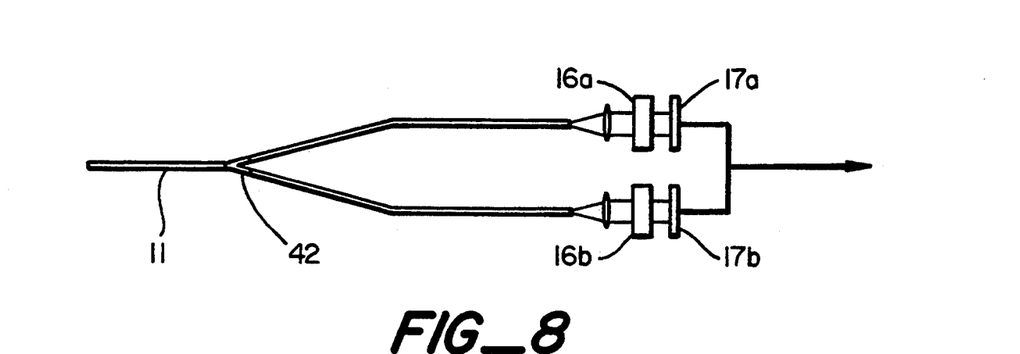
FIG. 8 shows a second system for recovering the modulation signals.
Figure 9:
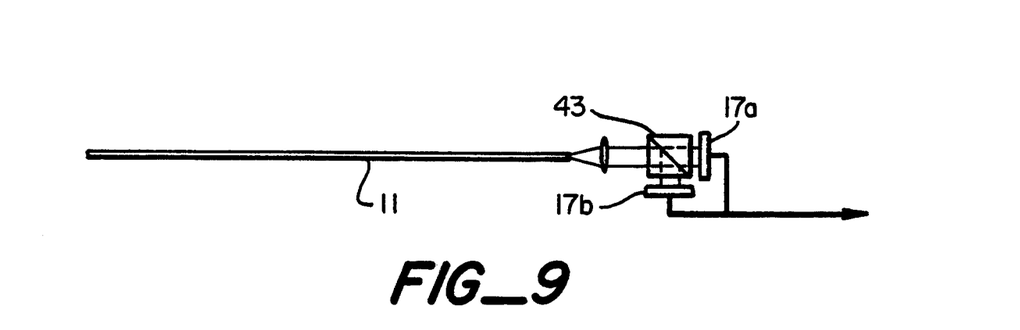
FIG. 9 shows a third system for recovering the modulation signals.

Several ways of extracting the input signal are shown in FIGS. 7-9. The simplest one is shown in FIG. 7 and uses a fiber polarization controller 41 to make the unmodulated output field linearly polarized prior to application to the analyzer 16. The analyzer 16 may be a polarizer. A less critical technique, FIG. 8, is to split the output signal into two parts with a fiber beam splitter 42 and place analyzers 16a, 16b polarized at right angles in front of the detectors 17a, 17b following the two output lines, and then adding the output of the two detectors. Finally, a similar result can be obtained by using a polarizing beam splitter 43 in front of a single fiber with the detector 17a, 17b on each face of the polarizing beam splitter 43 as shown in FIG. 9.

What is claimed is:

1. A modulator responsive to an electrical signal for changing the polarization state of a light wave transmitted along an optical fiber in accordance with said electrical signal including:

first and second acoustic transducers for generating first and second acoustic waves, respectively;
   means for acoustically coupling said first and second acoustic transducers to said optical fiber for causing the first and second acoustic waves to travel across said optical fiber to compress and decompress the optical fiber;
   said first and second acoustic transducers positioned so that said first and second acoustic waves travel across said optical fiber at a nonzero spatial angle that is not an integer multiple of 90 degrees with respect to one another; and
   means for exciting said first and second acoustic transducers with said electrical signal, said first and second acoustic transducers positioned and said electrical signal conditioned so that the first and second acoustic waves travel through the fiber with a predetermined nonzero phase relationship, said phase relationship being less than 180 degrees.

2. A modulator as in claim 1 wherein said first and second acoustic transducers are mounted on a substrate having substantially the same acoustical impedance as the optical fiber to couple the first and second acoustic transducers to the optical fiber.

3. A modulator as in claim 2 wherein the first and second acoustic transducers are equidistant from said optical fiber.

4. A modulator as in claim 1 wherein said spatial angle is substantially 45° and said phase is substantially 90°.

5. A modulator as in claim 3 wherein said first and second acoustic transducers are mounted at 45° spatial angle with respect to one another and said electrical signal is applied to the first and second acoustic transducers with a 90° phase shift.

6. In an optical communication system for transmitting an input signal from one location to another by modulating with said input signal light waves which travel along an optical fiber:

an optical fiber extending between said locations:
   a modulator coupled to said optical fiber having first and second acoustic transducers adapted to be acoustically coupled to said optical fiber to apply first and second acoustic waves across the optical fiber at a spatial angle with respect to one another to each compress and decompress the optical fiber in a region of said optical fiber in response to said input signal, whereby to modulate the polarization of the light waves travelling along said optical fiber past said region, and
   means for receiving said light wave having modulated polarization and generating an output signal representative of said input signal.

7. An optical communication system as in claim 6 including means for receiving said input and splitting said input signal into split signals which have a predetermined phase relationship and applying one split signal to one acoustic transducer and the other split signal to the other acoustic transducer.

8. An optical communication system as in claim 6 with means for extracting the output signal, using a fiber optic polarization controller to make the unmodulated output signal linearly polarized prior to application to an analyzer.

9. An optical communication system as in claim 6 with means for extracting the output signal by splitting the output signal into two parts with a fiber beam splitter, and placing analyzers at right angles in front of detectors following the two parts of the output signal, and adding the outputs of the detectors.

10. An optical communication system as in claim 6 with means for extracting the output signal by inserting the output signal from a single fiber into a polarizing beam splitter which splits the output signal into two parts, placing detectors on the two right-angled output faces of the polarizing beam splitter, and adding the outputs of the two detectors.

11. A modulator responsive to an electrical signal for changing the polarization state of a light wave transmitted along an optical fiber in accordance with said electrical signal including:

first and second acoustic transducers for generating first and second acoustic waves, respectively;
   means for acoustically coupling said first and second acoustic transducers to said optical fiber for causing the first and second acoustic waves to travel across said optical fiber to compress and decompress the optical fiber, wherein said first and second acoustic transducers are mounted on a substrate having substantially the same acoustical impedance as the optical fiber to couple the first and second acoustic transducers to the optical fiber;
   said first and second acoustic transducers positioned so that said first and second acoustic waves travel across said optical fiber at a spatial angle with respect to one another; and
   means for exciting said first and second acoustic transducers with said electrical signal, said first and second acoustic transducers positioned and said electrical signal conditioned so that the first and second acoustic waves travel through the fiber with a predetermined phase relationship.

12. A modulator as in claim 11 wherein the first and second acoustic transducers are equidistant from said optical fiber.

13. A modulator responsive to an electrical signal changing the polarization state of a light wave transmitted along an optical fiber in accordance with said electrical signal including:

first and second acoustic transducers for generating first and second acoustic waves, respectively;

means for acoustically coupling said first and second acoustic transducers to said optical fiber for causing the first and second acoustic waves to travel across said optical fiber to compress and decompress the optical fiber;

said first and second acoustic transducers positioned so that said first and second acoustic waves travel across said optical fiber at a spatial angle of substantially 45 degrees with respect to one another; and means for exciting said first and second acoustic transducers with said electrical signal, said first and second acoustic transducers positioned and said electrical signal conditioned so that the first and second acoustic waves travel through the fiber with a predetermined phase relationship of substantially 90 degrees.

14. A modulator as in claim 13 wherein said first and second acoustic transducers are mounted at 45° spatial angle with respect to one another and said electrical signal is applied to the first and second acoustic transducers with a 90° phase shift.

* * * * *

UNITED STATES PATENT AND TRADEMARK OFFICE
CERTIFICATE OF CORRECTION

PATENT NO. : 5,351,318
DATED : Sep. 27, 1994
INVENTOR(S) : Michial D. Howell, et al

It is certified that error appears in the above-indentified patent and that said Letters Patent is hereby corrected as shown below:

At column 1, line 60, amend "and zero in the Y direction" to read --and with zero component in the Y direction--

At column 2, line 21, amend "if $\Theta = 0$, passed" to read --if $\Theta = 0$, and none will be passed--

At column 2, line 31, amend "$\phi = 90°$ and $\cos(\phi) = \phi$." to read --$\phi = 90°$ and $\cos(\phi) = 0$.--

At column 2, line 37, amend "angle $\Theta\pi$away" to read --angle $\Theta\pi$ away--

At column 2, lines 45-46, amend "Acos(e)-sin(e)." to read --Acos($\Theta$)-sin($\Theta$).--

At column 3, line 53, amend "unmodulated output signal" to read --unmodulated input signal--

At column 5, line 41, amend "at the exit. Then" to read --at the exit, then--

At column 7, line 1, amend "can be evaporated" to read --can be melted--

At column 7, line 4, amend "Cases" to read --cases--

Signed and Sealed this

Tenth Day of September, 1996

BRUCE LEHMAN

Attest:

Attesting Officer

Commissioner of Patents and Trademarks